United States Patent
Selvaganapathy et al.

(10) Patent No.: US 12,289,766 B2
(45) Date of Patent: Apr. 29, 2025

(54) APPARATUS, METHODS, AND COMPUTER PROGRAMS

(71) Applicant: Nokia Technologies Oy, Espoo (FI)

(72) Inventors: Srinivasan Selvaganapathy, Bangalore (IN); Ahmad Awada, Munich (DE); Ingo Viering, Munich (DE)

(73) Assignee: Nokia Technologies Oy, Espoo (FI)

( * ) Notice: Subject to any disclaimer, the term of this patent is extended or adjusted under 35 U.S.C. 154(b) by 425 days.

(21) Appl. No.: 17/426,902

(22) PCT Filed: Feb. 4, 2020

(86) PCT No.: PCT/EP2020/052721
§ 371 (c)(1),
(2) Date: Jul. 29, 2021

(87) PCT Pub. No.: WO2020/164964
PCT Pub. Date: Aug. 20, 2020

(65) Prior Publication Data
US 2022/0104270 A1 Mar. 31, 2022

(30) Foreign Application Priority Data
Feb. 15, 2019 (IN) .............................. 201941006166

(51) Int. Cl.
*H04W 74/0833* (2024.01)
*H04W 72/0446* (2023.01)
*H04W 72/0453* (2023.01)
*H04W 72/23* (2023.01)
*H04W 74/08* (2009.01)
*H04W 76/15* (2018.01)

(52) U.S. Cl.
CPC ... *H04W 74/0833* (2013.01); *H04W 72/0446* (2013.01); *H04W 72/0453* (2013.01); *H04W 72/23* (2023.01); *H04W 74/0866* (2013.01); *H04W 76/15* (2018.02)

(58) Field of Classification Search
None
See application file for complete search history.

(56) References Cited

U.S. PATENT DOCUMENTS

| | | | |
|---|---|---|---|
| 8,670,762 B2 | 3/2014 | Mohanty et al. | |
| 8,909,227 B2 | 12/2014 | Kitazoe et al. | |
| 2012/0218973 A1* | 8/2012 | Du | H04W 36/14 370/331 |
| 2013/0188473 A1 | 7/2013 | Dinan | |

(Continued)

FOREIGN PATENT DOCUMENTS

EP 2947933 A1 11/2015

OTHER PUBLICATIONS

"New WID: NR mobility enhancements", 3GPP TSG RAN Meeting #80, RP-181433, Agenda: 9.1.10, Intel Corporation, May 21-25, 2018, 5 pages.

(Continued)

*Primary Examiner* — Jason E Mattis
*Assistant Examiner* — Bao G Nguyen
(74) *Attorney, Agent, or Firm* — McCarter & English LLP

(57) ABSTRACT

An apparatus has means for causing a random access message to be transmitted from a communications device to a target cell while the communications device is connected to a source cell and for receiving from the source cell information indicating that the random access message has been received by the target cell.

15 Claims, 10 Drawing Sheets

(56) References Cited

U.S. PATENT DOCUMENTS

| | | | | |
|---|---|---|---|---|
| 2014/0087729 | A1* | 3/2014 | Olofsson | H04W 36/00837 455/436 |
| 2014/0219204 | A1* | 8/2014 | Park | H04W 74/002 370/329 |
| 2016/0374079 | A1 | 12/2016 | Yasukawa et al. | |
| 2018/0084463 | A1 | 3/2018 | Tamaki et al. | |
| 2019/0253945 | A1* | 8/2019 | Paladugu | H04W 12/033 |
| 2020/0092917 | A1* | 3/2020 | Akkarakaran | H04W 52/0216 |
| 2020/0145888 | A1* | 5/2020 | Paladugu | H04W 36/0069 |
| 2020/0275325 | A1* | 8/2020 | Li | H04L 5/0055 |
| 2021/0211957 | A1* | 7/2021 | Kamohara | H04B 7/0617 |

OTHER PUBLICATIONS

"New Work Item on even further Mobility enhancement in E-UTRAN", 3GPP TSG RAN Meeting #80, RP-181337, Agenda: 10.1.1, China Telecom, Jun. 11-14, 2018, 4 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300, V15.3.0, Sep. 2018, pp. 1-358.

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340, V15.3.0, Sep. 2018, pp. 1-59.

Viering et al., "Zero-Zero Mobility: Intra-Frequency Handovers with Zero Interruption and Zero Failures", IEEE Network, vol. 32, No. 2, Mar.-Apr. 2018, pp. 48-54.

International Search Report and Written Opinion received for corresponding Patent Cooperation Treaty Application No. PCT/EP2020/052721, dated Apr. 20, 2020, 11 pages.

Office action received for corresponding Indian Patent Application No. 201941006166, dated Apr. 8, 2021, 5 pages.

\* cited by examiner

APPARATUS, METHODS, AND COMPUTER PROGRAMS

RELATED APPLICATION

This application claims priority to PCT Application No. PCT/EP2020/052721, filed on Feb. 4, 2020, which claims priority to INDIA application No. 201941006166, filed on Feb. 15, 2019, each of which is incorporated herein by reference in its entirety.

FIELD OF THE DISCLOSURE

The present disclosure relates to an apparatus, methods, and computer programs and in particular but not exclusively for apparatus, methods and computer programs to be used in a communications system.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communications devices.

Access to the communication system may be by means of an appropriate communications device or terminal. A communications device is provided with an appropriate signal receiving and transmitting apparatus for enabling communications, for example enabling access to a communication network or communications directly with other communications device. The communications device may access a carrier provided by a station or access point, and transmit and/or receive communications on the carrier.

The communication system and associated devices typically operate in accordance with a given standard or specification which sets out what the various entities associated with the system are permitted to do and how that should be achieved.

SUMMARY

According to an aspect, there is provided an apparatus comprising means for: causing a random access message to be transmitted from a communications device to a target cell while said communications device is connected to a source cell; and receiving from the source cell information indicating that the random access message has been received by said target cell.

The target cell may be controlled by a target base station.

The source cell may be controlled by a source base station.

The means may be for causing the random access message to transmitted when said communications device is to be handed over from the source cell to the target cell or when said communications device is adding the target cell as secondary node in a connectivity mode where said communications device is connected to a plurality of cells.

The random access message may comprise a dedicated random access channel preamble.

The random access message may be a message 1 (MSg1),

The random access message may further comprise information indicating that said communications device is ready to communicate with said target cell.

The random access message may further comprise information indicating that said communications device has completed a reconfiguration and is ready to communicate with said target cell.

The means may be for, when a response indicating that the random access message has been received by said target cell is not received by communications device directly from said target cell, causing said random access message to be transmitted by said communications device again to target cell without any ramp up of power The means may be for causing said communications device to monitor one or more of one or more time and/or frequency occasions in which said target cell transmits a response to said communication device in response to said random access message.

The response may be a random access response. The response may be message 2 (Msg2).

The information comprises information indicating said one or more time and/or frequency occasions.

The means may be for determining a random access failure if said response is not received by said communications device from said target cell within one of a predefined time duration and a predefined number of time and/or frequency occasions.

The information may comprises uplink information associated with communications between said communications device and said target cell.

The uplink information may comprise one or more of uplink grant information, timing advance information, and cell radio network temporary identifier information.

The means may be for using said uplink information to cause said communications device to send a message to said target cell.

This message may be a message 3 (Msg 3).

The apparatus may be a communications device or provided in a communications device.

According to another aspect, there is provided an apparatus for a base station of a source cell, said apparatus comprising means for: receiving from a target cell information indicating that a random access message transmitted from a communications device to the target cell has been received by said target cell, while said communications device is connected to the source cell; and causing information to be transmitted to said communications device indicating that said random access message has been received by said target cell.

The means may be for causing information to be transmitted to the target cell indicating if access by said communications device to said target cell is triggered early.

The target cell may be controlled by a target base station.

The random access message may be transmitted when said communications device is to be handed over from the source cell to the target cell or when said communications device is adding the target cell as secondary node in a connectivity mode where said communications device is connected to a plurality of cells.

The random access message may comprise a dedicated random access channel preamble.

The random access message may be a message 1 (MSg1),

The random access message may further comprise information indicating that said communications device is ready to communicate with said target cell.

The random access message may further comprise information indicating that said communications device has completed a reconfiguration and is ready to communicate with said target cell.

The information which is at least one of received from said target cell and transmitted to said communications device may comprise information indicating one or more time and/or frequency occasions in which said target cell will transmits a response to said communication device in response to said random access message.

According to another aspect, there is provided an apparatus for a base station of a target cell, said apparatus comprising means for: receiving from a communications device a random access message, while said communications device is connected to a source cell; and causing information to be transmitted to said source cell indicating that said random access message has been received by said target cell.

The target cell may be controlled by a target base station.

The source cell may be controlled by a source base station.

The random access message may be received when said communications device is to be handed over from the source cell to the target cell or when said communications device is adding the target cell as secondary node in a connectivity mode where said communications device is connected to a plurality of cells.

The random access message may comprise a dedicated random access channel preamble.

The random access message may be a message 1 (MSg1),

The random access message may further comprise information indicating that said communications device is ready to communicate with said target cell.

The random access message may further comprise information indicating that said communications device has completed a reconfiguration and is ready to communicate with said target cell.

The means may be for causing a response to be transmitted to the communications device.

The response may be a random access response. The response may be message 2 (Msg2).

The response may comprise information may comprises uplink information associated with communications between said communications device and said target cell.

The uplink information may comprise one or more of uplink grant information, timing advance information, and cell radio network temporary identifier information The means may be for causing the response to be transmitted to the communications device at one or more of one or more time and/or frequency occasions.

The information which is caused to be transmitted to the source cell may indicate said one or more time and/or frequency occasions.

The means may be for receiving information from said source cell indicating if access by said communications device to said target cell is triggered early.

According to another aspect there is provided an apparatus comprising at least one processor and at least one memory including computer code for one or more programs, the at least one memory and the computer code configured, with the at least one processor, to cause the apparatus at least to: cause a random access message to be transmitted from a communications device to a target cell while said communications device is connected to a source cell; and receive from the source cell information indicating that the random access message has been received by said target cell.

The target cell may be controlled by a target base station.

The source cell may be controlled by a source base station.

The at least one memory and the computer code may be configured, with the at least one processor, to cause the apparatus to cause the random access message to transmitted when said communications device is to be handed over from the source cell to the target cell or when said communications device is adding the target cell as secondary node in a connectivity mode where said communications device is connected to a plurality of cells.

The random access message may comprise a dedicated random access channel preamble.

The random access message may be a message 1 (MSg1),

The random access message may further comprise information indicating that said communications device is ready to communicate with said target cell.

The random access message may further comprise information indicating that said communications device has completed a reconfiguration and is ready to communicate with said target cell.

The at least one memory and the computer code may be configured, with the at least one processor, to cause the apparatus to, when a response indicating that the random access message has been received by said target cell is not received by communications device directly from said target cell, cause said random access message to be transmitted by said communications device again to target cell without any ramp up of power.

The at least one memory and the computer code may be configured, with the at least one processor, to cause the apparatus to cause said communications device to monitor one or more of one or more time and/or frequency occasions in which said target cell transmits a response to said communication device in response to said random access message.

The response may be a random access response. The response may be message 2 (Msg2).

The information comprises information indicating said one or more time and/or frequency occasions The at least one memory and the computer code may be configured, with the at least one processor, to cause the apparatus to determine a random access failure if said response is not received by said communications device from said target cell within one of a predefined time duration and a predefined number of time and/or frequency occasions.

The information may comprises uplink information associated with communications between said communications device and said target cell.

The uplink information may comprise one or more of uplink grant information, timing advance information, and cell radio network temporary identifier information.

The at least one memory and the computer code may be configured, with the at least one processor, to cause the apparatus to use said uplink information to cause said communications device to send a message to said target cell.

This message may be a message 3 (Msg 3).

The apparatus may be a communications device or provided in a communications device.

According to another aspect there is provided an apparatus for a base station of a source cell, said apparatus comprising at least one processor and at least one memory including computer code for one or more programs, the at least one memory and the computer code configured, with the at least one processor, to cause the apparatus at least to: receive from a target cell information indicating that a random access message transmitted from a communications device to the target cell has been received by said target cell, while said communications device is connected to the source cell; and cause information to be transmitted to said communications device indicating that said random access message has been received by said target cell.

The at least one memory and the computer code may be configured, with the at least one processor, to cause the apparatus to cause information to be transmitted to the target cell indicating if access by said communications device to said target cell is triggered early.

The target cell may be controlled by a target base station.

The random access message may be transmitted when said communications device is to be handed over from the source cell to the target cell or when said communications device is adding the target cell as secondary node in a connectivity mode where said communications device is connected to a plurality of cells.

The random access message may comprise a dedicated random access channel preamble.

The random access message may be a message 1 (MSg1),

The random access message may further comprise information indicating that said communications device is ready to communicate with said target cell.

The random access message may further comprise information indicating that said communications device has completed a reconfiguration and is ready to communicate with said target cell.

The information which is at least one of received from said target cell and transmitted to said communications device may comprise information indicating one or more time and/or frequency occasions in which said target cell will transmits a response to said communication device in response to said random access message.

According to another aspect, there is provided an apparatus for a base station of a target cell, said apparatus comprising at least one processor and at least one memory including computer code for one or more programs, the at least one memory and the computer code configured, with the at least one processor, to cause the apparatus at least to: receive from a communications device a random access message, while said communications device is connected to a source cell; and cause information to be transmitted to said source cell indicating that said random access message has been received by said target cell.

The target cell may be controlled by a target base station.

The source cell may be controlled by a source base station.

The random access message may be received when said communications device is to be handed over from the source cell to the target cell or when said communications device is adding the target cell as secondary node in a connectivity mode where said communications device is connected to a plurality of cells.

The random access message may comprise a dedicated random access channel preamble.

The random access message may be a message 1 (MSg1),

The random access message may further comprise information indicating that said communications device is ready to communicate with said target cell.

The random access message may further comprise information indicating that said communications device has completed a reconfiguration and is ready to communicate with said target cell.

The at least one memory and the computer code may be configured, with the at least one processor, to cause the apparatus to cause a response to be transmitted to the communications device.

The response may be a random access response. The response may be message 2 (Msg2).

The response may comprise information may comprises uplink information associated with communications between said communications device and said target cell.

The uplink information may comprise one or more of uplink grant information, timing advance information, and cell radio network temporary identifier information The at least one memory and the computer code may be configured, with the at least one processor, to cause the apparatus to cause the response to be transmitted to the communications device at one or more of one or more time and/or frequency occasions.

The information which is caused to be transmitted to the source cell may indicate said one or more time and/or frequency occasions.

The at least one memory and the computer code may be configured, with the at least one processor, to cause the apparatus to receive information from said source cell indicating if access by said communications device to said target cell is triggered early.

According to an aspect there is provided an apparatus comprising circuitry configured to: cause a random access message to be transmitted from a communications device to a target cell while said communications device is connected to a source cell; and receive from the source cell information indicating that the random access message has been received by said target cell.

The target cell may be controlled by a target base station.

The source cell may be controlled by a source base station.

The circuitry may be configured to cause the apparatus to cause the random access message to transmitted when said communications device is to be handed over from the source cell to the target cell or when said communications device is adding the target cell as secondary node in a connectivity mode where said communications device is connected to a plurality of cells.

The random access message may comprise a dedicated random access channel preamble.

The random access message may be a message 1 (MSg1),

The random access message may further comprise information indicating that said communications device is ready to communicate with said target cell.

The random access message may further comprise information indicating that said communications device has completed a reconfiguration and is ready to communicate with said target cell.

The circuitry may be configured to, when a response indicating that the random access message has been received by said target cell is not received by communications device directly from said target cell, cause said random access message to be transmitted by said communications device again to target cell without any ramp up of power.

The circuitry may be configured to cause said communications device to monitor one or more of one or more time and/or frequency occasions in which said target cell transmits a response to said communication device in response to said random access message.

The response may be a random access response. The response may be message 2 (Msg2).

The information comprises information indicating said one or more time and/or frequency occasions The circuitry may be configured to determine a random access failure if said response is not received by said communications device from said target cell within one of a predefined time duration and a predefined number of time and/or frequency occasions.

The information may comprises uplink information associated with communications between said communications device and said target cell.

The uplink information may comprise one or more of uplink grant information, timing advance information, and cell radio network temporary identifier information.

The circuitry may be configured to use said uplink information to cause said communications device to send a message to said target cell.

This message may be a message 3 (Msg 3).

The apparatus may be a communications device or provided in a communications device.

According to another aspect, there is provided an apparatus for a base station of a source cell, said apparatus comprising circuitry configured to: receive from a target cell information indicating that a random access message transmitted from a communications device to the target cell has been received by said target cell, while said communications device is connected to the source cell; and cause information to be transmitted to said communications device indicating that said random access message has been received by said target cell.

The circuitry may be configured to cause information to be transmitted to the target cell indicating if access by said communications device to said target cell is triggered early.

The target cell may be controlled by a target base station.

The random access message may be transmitted when said communications device is to be handed over from the source cell to the target cell or when said communications device is adding the target cell as secondary node in a connectivity mode where said communications device is connected to a plurality of cells.

The random access message may comprise a dedicated random access channel preamble.

The random access message may be a message 1 (MSg1),

The random access message may further comprise information indicating that said communications device is ready to communicate with said target cell.

The random access message may further comprise information indicating that said communications device has completed a reconfiguration and is ready to communicate with said target cell.

The information which is at least one of received from said target cell and transmitted to said communications device may comprise information indicating one or more time and/or frequency occasions in which said target cell will transmits a response to said communication device in response to said random access message.

According to another aspect, there is provided an apparatus for a base station of a target cell, said apparatus comprising circuitry configured to: receive from a communications device a random access message, while said communications device is connected to a source cell; and cause information to be transmitted to said source cell indicating that said random access message has been received by said target cell.

The target cell may be controlled by a target base station.

The source cell may be controlled by a source base station.

The random access message may be received when said communications device is to be handed over from the source cell to the target cell or when said communications device is adding the target cell as secondary node in a connectivity mode where said communications device is connected to a plurality of cells.

The random access message may comprise a dedicated random access channel preamble.

The random access message may be a message 1 (MSg1),

The random access message may further comprise information indicating that said communications device is ready to communicate with said target cell.

The random access message may further comprise information indicating that said communications device has completed a reconfiguration and is ready to communicate with said target cell.

The circuitry may be configured to cause a response to be transmitted to the communications device.

The response may be a random access response. The response may be message 2 (Msg2).

The response may comprise information may comprises uplink information associated with communications between said communications device and said target cell.

The uplink information may comprise one or more of uplink grant information, timing advance information, and cell radio network temporary identifier information The circuitry may be configured to cause the response to be transmitted to the communications device at one or more of one or more time and/or frequency occasions.

The information which is caused to be transmitted to the source cell may indicate said one or more time and/or frequency occasions.

The circuitry may be configured to receive information from said source cell indicating if access by said communications device to said target cell is triggered early.

According to an aspect, there is provided a method comprising: causing a random access message to be transmitted from a communications device to a target cell while said communications device is connected to a source cell; and receiving from the source cell information indicating that the random access message has been received by said target cell.

The target cell may be controlled by a target base station.

The source cell may be controlled by a source base station.

The method may comprise causing the random access message to transmitted when said communications device is to be handed over from the source cell to the target cell or when said communications device is adding the target cell as secondary node in a connectivity mode where said communications device is connected to a plurality of cells.

The random access message may comprise a dedicated random access channel preamble.

The random access message may be a message 1 (MSg1),

The random access message may further comprise information indicating that said communications device is ready to communicate with said target cell.

The random access message may further comprise information indicating that said communications device has completed a reconfiguration and is ready to communicate with said target cell.

The method may comprise, when a response indicating that the random access message has been received by said target cell is not received by communications device directly from said target cell, causing said random access message to be transmitted by said communications device again to target cell without any ramp up of power The method may comprise causing said communications device to monitor one or more of one or more time and/or frequency occasions in which said target cell transmits a response to said communication device in response to said random access message.

The response may be a random access response. The response may be message 2 (Msg2).

The information comprises information indicating said one or more time and/or frequency occasions.

The method may comprise determining a random access failure if said response is not received by said communications device from said target cell within one of a predefined time duration and a predefined number of time and/or frequency occasions.

The information may comprises uplink information associated with communications between said communications device and said target cell.

The uplink information may comprise one or more of uplink grant information, timing advance information, and cell radio network temporary identifier information.

The method may comprise using said uplink information to cause said communications device to send a message to said target cell.

This message may be a message 3 (Msg 3)

The method may be performed in an apparatus. The apparatus may be the communications device or provided in the communications device.

According to another aspect, there is provided a method in a base station of a source cell, said method comprising: receiving from a target cell information indicating that a random access message transmitted from a communications device to the target cell has been received by said target cell, while said communications device is connected to the source cell; and causing information to be transmitted to said communications device indicating that said random access message has been received by said target cell.

The method may comprise causing information to be transmitted to the target cell indicating if access by said communications device to said target cell is triggered early.

The target cell may be controlled by a target base station.

The random access message may be transmitted when said communications device is to be handed over from the source cell to the target cell or when said communications device is adding the target cell as secondary node in a connectivity mode where said communications device is connected to a plurality of cells.

The random access message may comprise a dedicated random access channel preamble.

The random access message may be a message 1 (MSg1),

The random access message may further comprise information indicating that said communications device is ready to communicate with said target cell.

The random access message may further comprise information indicating that said communications device has completed a reconfiguration and is ready to communicate with said target cell.

The information which is at least one of received from said target cell and transmitted to said communications device may comprise information indicating one or more time and/or frequency occasions in which said target cell will transmits a response to said communication device in response to said random access message.

According to another aspect, there is provided a method in a base station of a target cell comprising: receiving from a communications device a random access message, while said communications device is connected to a source cell; and causing information to be transmitted to said source cell indicating that said random access message has been received by said target cell.

The target cell may be controlled by a target base station.

The source cell may be controlled by a source base station.

The random access message may be received when said communications device is to be handed over from the source cell to the target cell or when said communications device is adding the target cell as secondary node in a connectivity mode where said communications device is connected to a plurality of cells.

The random access message may comprise a dedicated random access channel preamble.

The random access message may be a message 1 (MSg1),

The random access message may further comprise information indicating that said communications device is ready to communicate with said target cell.

The random access message may further comprise information indicating that said communications device has completed a reconfiguration and is ready to communicate with said target cell.

The method may comprise causing a response to be transmitted to the communications device.

The response may be a random access response. The response may be message 2 (Msg2).

The response may comprise uplink information associated with communications between said communications device and said target cell.

The uplink information may comprise one or more of uplink grant information, timing advance information, and cell radio network temporary identifier information The method may comprise causing the response to be transmitted to the communications device at one or more of one or more time and/or frequency occasions.

The information which is caused to be transmitted to the source cell may indicate said one or more time and/or frequency occasions.

The method may comprise receiving information from said source cell indicating if access by said communications device to said target cell is triggered early.

According to an aspect there is provided a computer program comprising computer executable code which when run on at least one processor is configured to cause any of the previously described methods to be performed.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

BRIEF DESCRIPTION OF THE FIGURES

Embodiments will now be described, by way of example only, with reference to the accompanying Figures in which.

DETAILED DESCRIPTION OF THE FIGURES

In the following certain embodiments are explained with reference to communications devices capable of communication via a wireless cellular system and communication systems serving such communications devices. Before explaining in detail the exemplifying embodiments, certain general principles of a wireless communication system, access systems thereof, and communications devices are briefly explained with reference to FIGS. 1 to 4 to assist in understanding the technology underlying the described examples.

Figure 1:
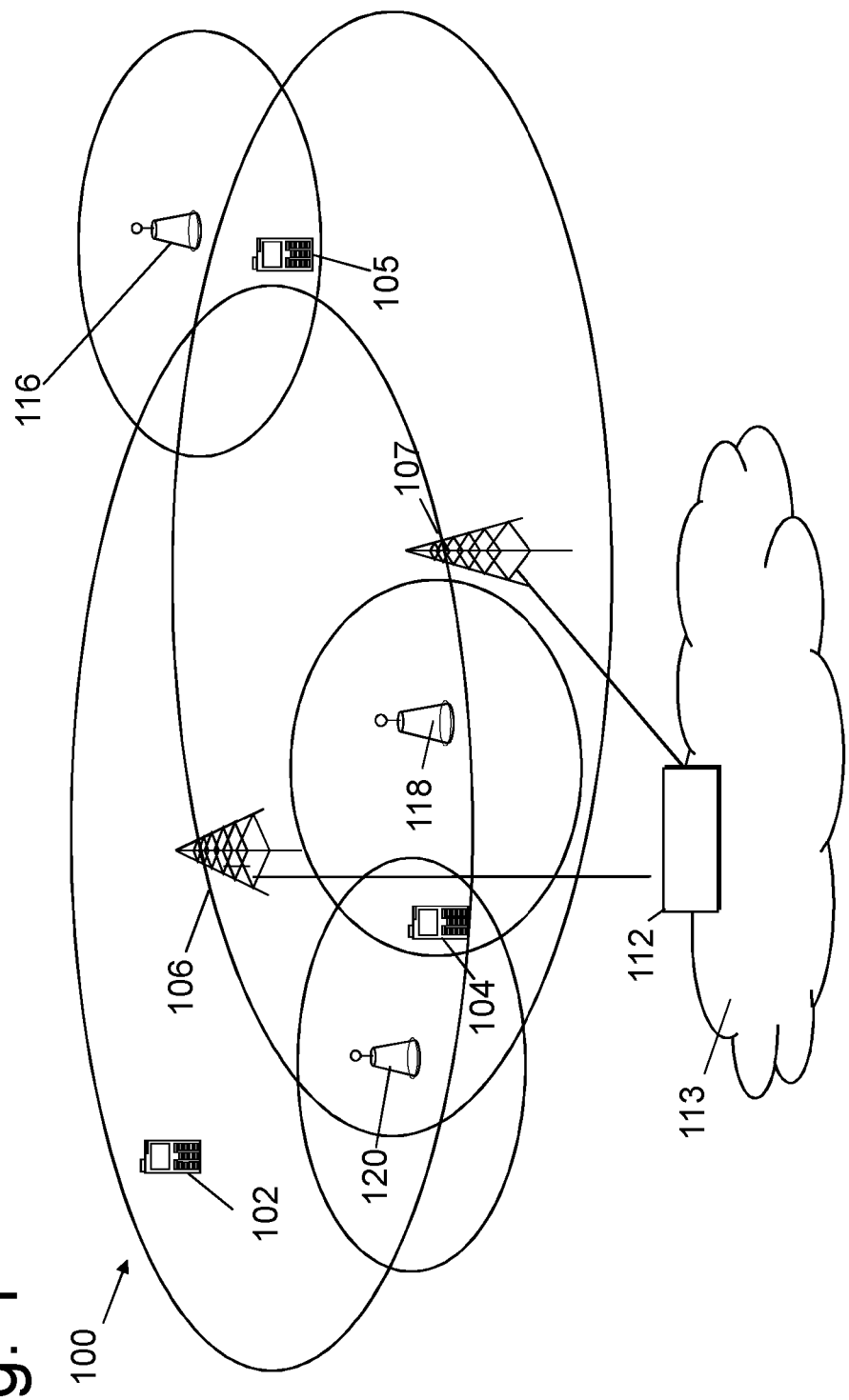
FIG. 1 shows a schematic representation of a communication system.

Reference is made to FIG. 1 which shows an example system 100 in which some embodiments may be provided. The system may be a wireless communications system. In a wireless communication system 100, such as that shown in FIG. 1, communication devices or user equipment (UE) 102, 104, 105 are provided. This communications devices will be referred to as UEs but it should be appreciated that the device may be any suitable communications device and the term UE is intended to cover any such device. Some examples of communications devices are discussed below and as used in this document the term UE is intended to cover any one or more of those devices and/or any other suitable device.

The UEs may be provided wireless access via at least one base station (or similar wireless transmitting and/or receiving node or point.

In FIG. 1, there are base stations 106 and 107 which serve relative large cells. Smaller base stations 116, 118 and 120 may also be provided. The smaller base stations 116, 118 and 120 may be pico or femto level base stations or the like. In some embodiments, the smaller base stations may not be provided.

One or more of the base stations may communicate with a network 113 via one or more network functions 112. One or more of the base stations may communicate with the network via one or more other base stations. For example one or more smaller base stations may communicate with a network via one or more of the large base stations.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). One 3GPP based development is often referred to as the long term evolution (LTE) of the Universal Mobile Telecommunications System (UMTS) radio-access technology. Some developments of LTE are referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs). Another example of a suitable communications system is the 5G or New Radio (NR) concept. Base stations of NR systems may be known as next generation Node Bs (gNBs). The base station may be a ng-eNB. Other examples of radio access system comprise those provided by base stations of systems that are based on technologies such as wireless local area network (WLAN) and/or WiMAX (Worldwide Interoperability for Microwave Access). A base station can provide coverage for an entire cell or similar radio service area.

Figure 2:
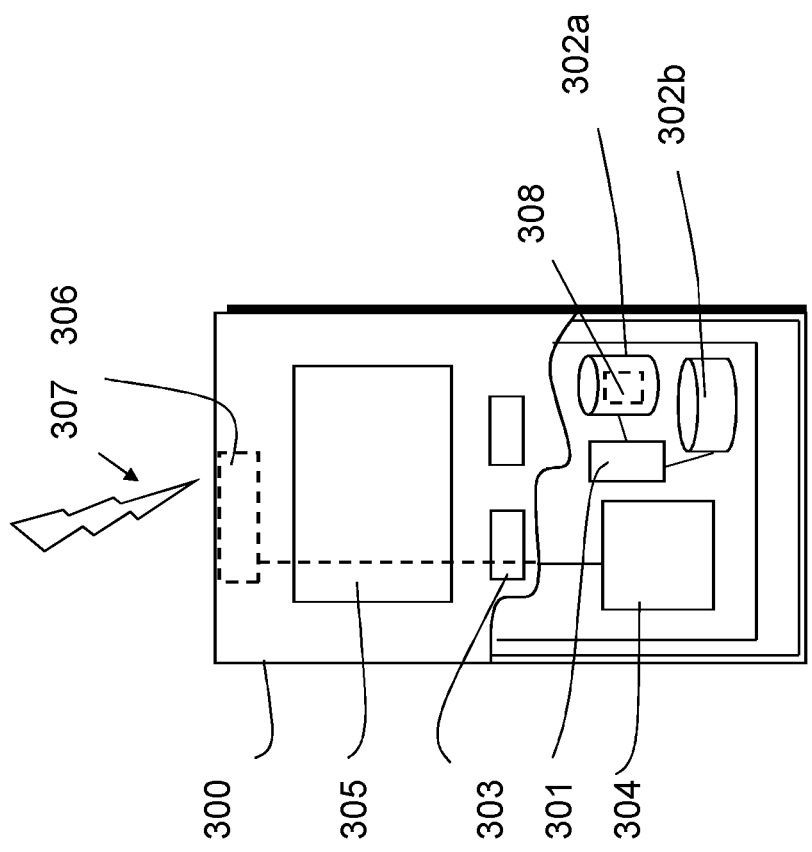
FIG. 2 shows a schematic representation of a communications device.

FIG. 2 illustrates an example of a communications device 300, such as the wireless communications device 102, 104 or 105 shown on FIG. 1. The wireless communications device 300 may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, machine-type communications (MTC) devices, IoT type communications devices or any combinations of these or the like.

The device 300 may receive signals over an air or radio interface 307 via appropriate apparatus for receiving and may transmit signals via appropriate apparatus for transmitting radio signals. In FIG. 2 transceiver apparatus is designated schematically by block 306. The transceiver apparatus 306 may be provided for example by means of a radio part and associated antenna arrangement. The antenna arrangement may be arranged internally or externally to the mobile device. In some embodiments, a plurality of transceivers may be provided by the transceiver apparatus.

The wireless communications device 300 may be provided with at least one processor 301 and at least one memory. The at least one memory may comprise at least one ROM 302a and/or at least one RAM 302b. The communications device may comprise other possible components 303 for use in software and hardware aided execution of tasks it is designed to perform, including control of access to and communications with access systems and other communications devices. The at least one processor 301 is coupled to the at least one memory. The at least one processor 301 may be configured to execute an appropriate software code 308 to implement one or more of the following aspects. The software code 308 may be stored in the at least one memory, for example in the at least one ROM 302b.

The processor, storage and other relevant control apparatus can be provided on an appropriate circuit board and/or in chipsets. This feature is denoted by reference 304.

The device may optionally have a user interface such as key pad 305, touch sensitive screen or pad, combinations thereof or the like.

Optionally one or more of a display, a speaker and a microphone may be provided depending on the type of the device.

Communication protocols and/or parameters which shall be used for the connection are also typically defined. The communications devices may access the communication system based on various access techniques.

Figure 3:
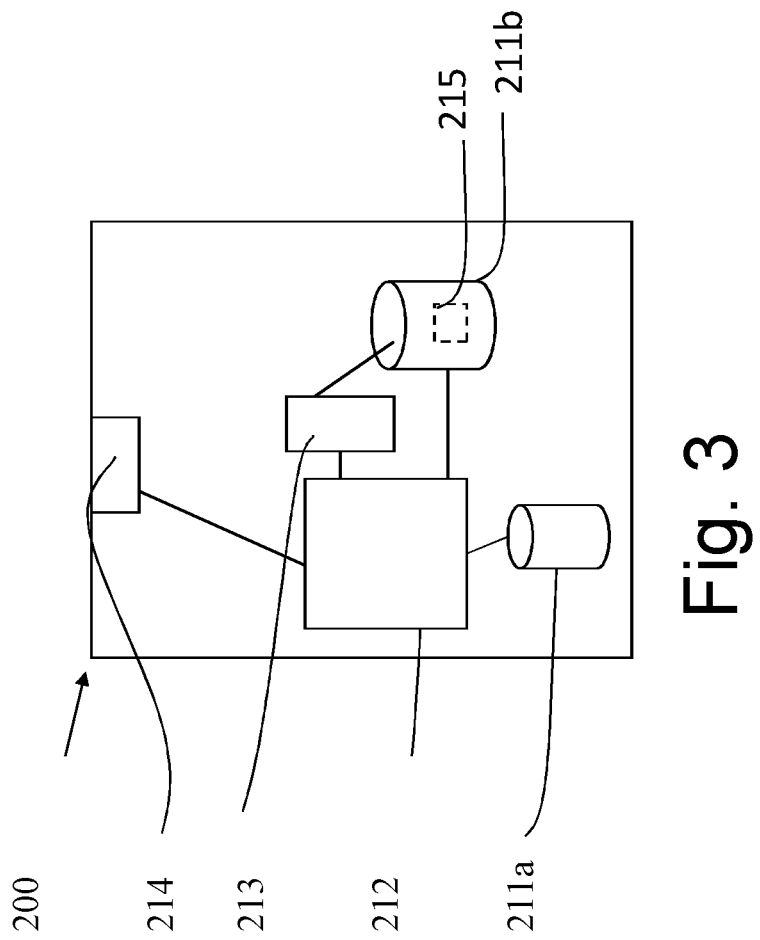
FIG. 3 shows a schematic representation of an apparatus in a base station.

An example apparatus 200 is shown in FIG. 3. The apparatus shown in FIG. 3 may be provided in a base station. The apparatus comprises at least one memory. The at least one memory may be at least one random access memory (RAM) 211*a* and/or at least one read only memory (ROM) 211*b*, at least one processor 212, 213 and an input/output interface 214. The at least one processor 212, 213 is coupled to the RAM 211*a* and the ROM 211*b*. The at least one processor 212, 213 may be configured to execute an appropriate software code 215 to implement one or more of the following aspects. The software code 215 may be stored in the ROM 211*b*.

Figure 4:
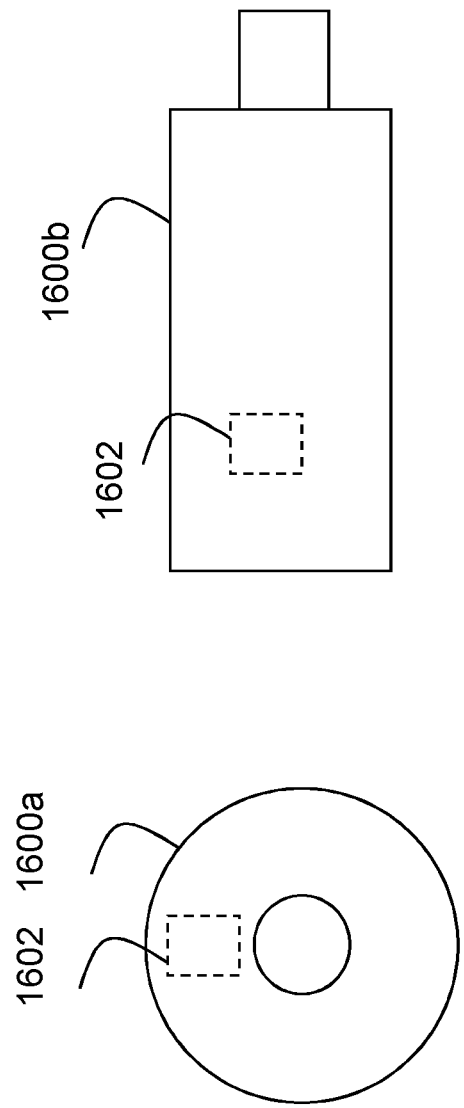
FIG. 4 shows a schematic representation of a non-volatile memory medium storing instructions which when executed by a processor allow a processor to perform one or more of the steps of the method of some embodiments.

FIG. 4 shows a schematic representation of non-volatile memory media 1600*a* (e.g. computer disc (CD) or digital versatile disc (DVD)) and 1600*b* (e.g. universal serial bus (USB) memory stick) storing instructions and/or parameters 1602 which when executed by a processor allow the processor to perform one or more of the steps of any of the methods of any of the embodiments.

Some embodiment may provide a random access channel (RACH) procedure for a UE that is performing access to a target base station (BS) while being connected to another source base station.

It should be appreciate that there are various different scenarios where a UE may have a plurality of connections to more than one base station at the same time. By way of example some of those scenarios will now be described.

A UE may be provided with two or more two or more transceivers (TRXs). The UE may perform RACH access to a target cell while transmitting/receiving user data from a source cell.

The RACH access to a target BS while being connected to another BS has been proposed, for example in Long Term Evolution (LTE) and New Radio (NR) or 5G in the context of mobility solutions to attempt to minimize the data interruption time to 0 ms or close thereto.

One option may be to use a non split bearer solution where the UE establishes a new data radio bearer (DRB) at the target cell before releasing the DRB of source cell. In this option, the UE performs a RACH access to the target cell while transmitting/receiving from the source cell.

Another option may be to use a split bearer solution where the UE adds the target cell as secondary node (SN) and the bearer anchored at the source cell, acting as a master node (MN), is split at the e.g., packet data convergence protocol (PDCP) level. This means that the SN receives PDCP PDUs (protocol data units) from the master node. The addition of the target cell as a SN requires the UE to perform a RACH access while being connected to the source cell. The split bearer solution may be used in the context of dual connectivity (DC). DC is used for example in LTE.

The source and target BSs may operate on the same frequency (intra-frequency handover) or different frequencies (inter-frequency handover).

The source and target BSs may be enhanced NodeB (eNBs) and next generation Node B (gNBs) if used in the context of LTE and NR systems, respectively.

Multi-RAT (radio access technology) dual connectivity (MR-DC) is where a UE with a plurality of receivers/transmitters may be configured to utilize resources provided by two different nodes connected via a backhaul connection. For example, one node provides LTE access and the other node provides NR access. One node acts as a MN and the other as a SN. In MR-DC, the UE performs RACH access to the SN while being connected to the MN.

Some different examples of MR-DC will now be described.

In E-UTRA-NR DC (evolved UMTS (universal mobile telecommunications network) terrestrial radio access network—NR DC) (EN-DC), the UE is connected to one eNB that acts as a MN and one enhanced gNB (en-gNB) that acts as a SN. The eNB is connected to the LTE core via an S1 interface and to the en-gNB via the X2 interface. The X2 interface is the interface between two base stations. The en-gNB might also be connected to the LTE core via a S1-U interface.

In NG-RAN E-UTRA-NR Dual Connectivity (NGEN-DC), a UE is connected to one next generation-eNB (ng-eNB) that acts as a MN and one gNB that acts as a SN. The ng-eNB is connected to the 5G core and the gNB is connected to the ng-eNB via the Xn interface. The Xn interface is between the base stations.

A gNB may operate in accordance with a 5G protocol with respect to a UE. A ng-eNB may operate in accordance with an LTE/E-UTRAN protocol with respect to a UE. However, both the gNB and ng-eNB may operate in accordance with NG or 5G protocols with respect to the core.

In NR-E-UTRA dual connectivity (NE-DC), a UE is connected to one gNB that acts as a MN and one ng-eNB that acts as a SN. The gNB is connected to 5G core and the ng-eNB is connected to the gNB via the Xn interface.

In this document, the term target BS is used to denote the BS that the UE performs RACH access to while being connected to another source BS.

In context of DC or MR-DC, the target BS is an SN and the source BS is an MN.

The BS can be any suitable BS operating in accordance with any suitable protocol. By way of example only, the BS may be an eNB, a gNB, a ng-eNB or any other suitable base station.

Where a UE is capable of connectivity with two cells at the same time, for example during a handover procedure (using split or non-split bearer solutions), DC or MR-DC operation, the UE can continue with the connectivity of the source cell when establishing the connection to target cell.

It should be appreciated that some embodiments may be used in any scenario where there is connectivity with two cells at the same time. This may be an ongoing dual connectivity scenario or a make before break type handover scenario or any other suitable scenario.

To establish a connection with a target cell, a RACH procedure may be used to obtain the uplink synchronisation with target cell. During this procedure, the UE only maintains single connectivity with the source cell and the duplication or simultaneous transmission/reception via source and target cell may only start once the whole random access procedure is completed.

A RACH procedure may involve one or more of the following messages.

Msg1: a random access preamble is sent from the UE to the target base station.

Msg2: a preamble response/random access response is received by the UE from the base station. This is sometimes referred to as the RAR (RACH response).

Msg3: a terminal identity etc. in e.g., connection request (during initial access from radio resource control (RRC) Idle mode) or RRC (connection) reconfiguration complete (during handover) is sent to target base station by the UE.

It should be appreciated that this is one example of a RACH procedure and any other suitable RACH may be used.

In split bearer based handover, DC or MR-DC, the target cell is typically added early as a SN when the radio condition of the target cell is slightly inferior to that of the source cell. As such, the RACH procedure to the target cell may fail. The failure may be e.g. due to downlink interference, whereas the uplink might be interference free (e.g. due to little uplink load). In this case, a RACH preamble (Msg1) will go through in the uplink, but the RACH response (RAR (RACH response), Msg2) may be not received by the UE on the downlink. In such a case the UE may continuously repeat the RACH with ramped power. This may be undesirable.

Some embodiments provide a RACH procedure towards a target cell, while the UE maintains the connectivity with source cell.

A source node may provide the UE with dedicated preamble to be used for contention free RACH access (CFRA) at target cell. This may be provided as part of a message. This message may be an RRC-Reconfiguration message. The message may contain a DC or MR-DC configuration, or handover command. The source node may receive the dedicated preamble from the target cell.

The UE may start the RACH procedure by sending the dedicated preamble to target cell (Msg1).

The target cell receives the RACH preamble and sends a response. The response may be a random access response (RAR). The response may contain an uplink-grant and/or timing advance. This may be Msg2.

The target cell may inform the source cell via X2/Xn interface or via any other suitable communication path that it has received the dedicated preamble. Optionally, the target cell may also send a part or a whole of the target cell response (e.g. the RAR) to the source cell.

The source cell may indicate to the target cell how early the access to the target cell is triggered such that the target cell can make a better decision on whether to inform the source cell about what the target cell has received from the UE and/or what the target cell has sent to the UE. The RACH access may be considered early when, for example, the received signal strength/quality of the target cell is smaller, for example by an offset, than that of source cell. The timing of the RACH access can be considered normal when, for example, the received signal/quality of the target cell is higher, for example by an offset, than that of source cell. The target cell may communicate with the source cell via the X2/Xn interface or other communication path. The information which the target cell provides may be information about the reception of the dedicated preamble and/or information may be the response sent by the target cell to the UE, e.g. the RAR. The indication can be a binary bit (1 for early access and 0 for normal or vice versa) and/or one or more parameters used to trigger the access to the target cell by the UE. These one more parameters may comprise an offset or absolute threshold used to evaluate the signal strength and/or quality of the target cell. This may for example be a part of the measurement report sent by the UE to the source BS.

The source cell may send to the UE a message informing the UE of the successful reception of the message (e.g. Msg1) at the target cell and/or response (e.g. RAR) related information, if provided by the target cell. The message sent by the source cell to the UE may be a MAC (medium access control) CE control element) or an RRC message On reception of this message, the UE may stop sending further RACH attempts towards target cell. The UE may continue listening to the target cell for receiving RAR. Alternatively, the UE may stop power ramp-up of the RACH access messages towards target-cell. This may reduce unnecessary RACH pollution.

Alternatively, the UE may stop RACH attempts and continue using the information provided by the source cell. For example, the UE may continue with a Message 3 (Msg3) transmission using e.g. the RAR information received from the target cell via the source cell. This may reduce the RACH pollution and/or may speed up the RACH procedure in case the downlink channel improves (which may happen in a handover situation).

In some embodiments, the target cell may continue to send the response, e.g. the RAR, for the dedicated preamble addressed by random access-radio network temporary identifier (RA-RNTI) a configurable number of times. The target cell may use the RA-RNTI which corresponds to the first RACH preamble transmission. The target cell may inform the UE via the source cell about the time/frequency occasions that the UE should monitor for receiving the response, e.g. the RAR, from the target cell. If the UE does not receive the target cell response, e.g. RAR, within specific timeout or pre-configured number of RAR occasions, UE can declare the RACH access failure.

Some embodiments may provide a method where the target cell sends an indication of successful RACH preamble reception and/or (RAR for the received dedicated preamble to UE via a source cell with which the UE still maintains the connectivity.

Some embodiments may provide a method where the UE listens for the target cell response (e.g. RAR) via the source cell. When the UE receives via the source cell, the RAR or an indication of a successful RACH preamble reception, the UE may do one of the following: stop transmission of RACH preamble and continue listening to target cell for receiving RAR; continue the RACH attempt but without power ramp-up; and send a message (e.g. a Msg3) to the target cell using the provided uplink grant information.

Some embodiments may provide a method where a target cell continues to send RAR for the dedicated preamble a configurable number of times using, for example the RA-RNTI, after successfully receiving a RACH preamble.

Figure 5:
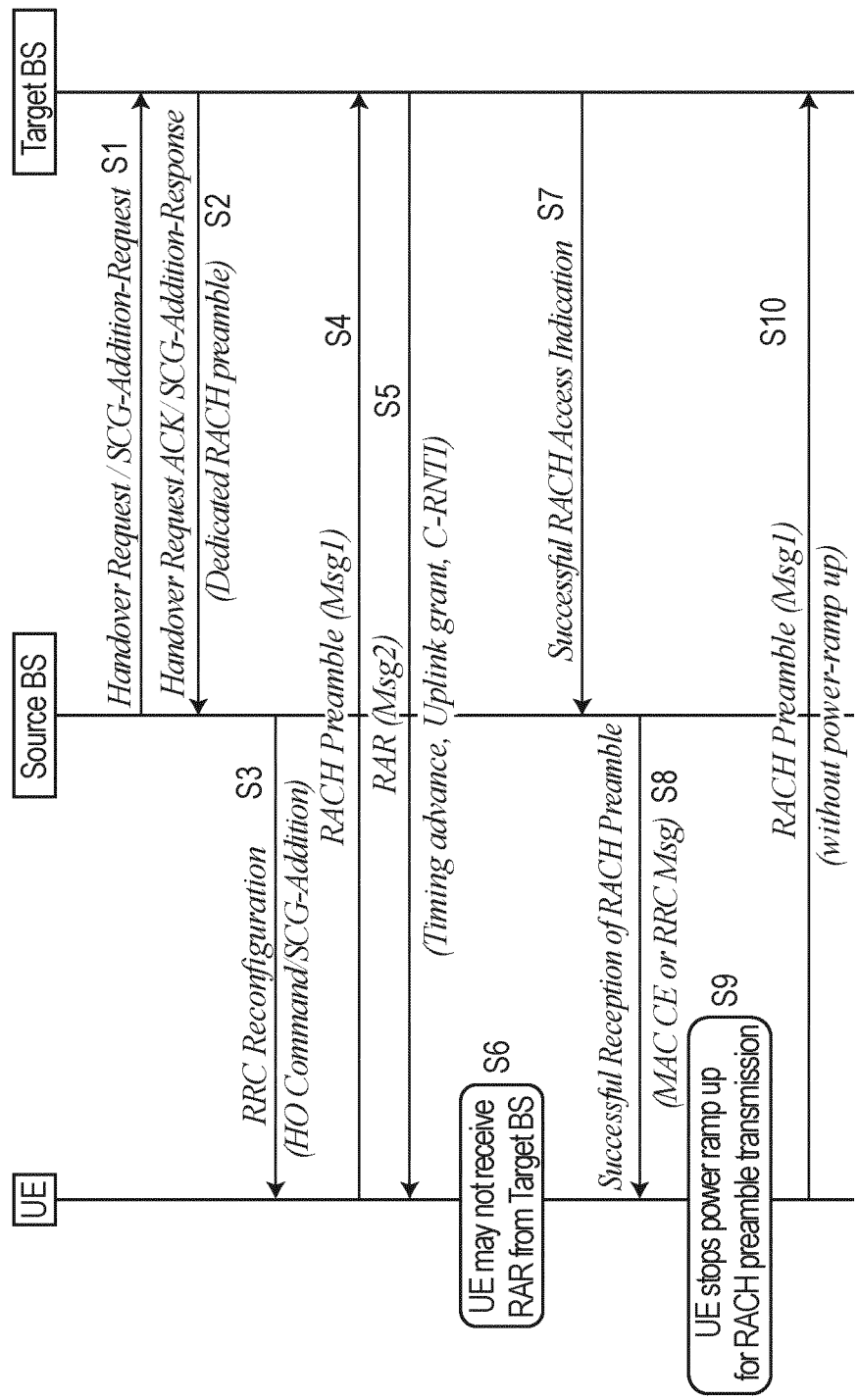
FIG. 5 shows a first signalling flow of some embodiments.

Reference is made to FIG. 5 which shows a method of some embodiments. This Figure shows the case when a UE stops a power ramp up for RACH preamble transmission. The UE will transmit again the RACH preamble, but will not increase its transmitted power. If the UE receives the RAR directly from the target BS, it can simply ignore the successful reception of RACH preamble from the source BS and proceed in sending Msg3 to target BS.

In step S1, the source base station sends a request to the target base station. The request may be any suitable request such as a handover request or a SCG (secondary cell group) addition request.

In step S2, the target base station sends a response to the message received in step S1 to the source base station. The response may be a handover request acknowledgement or a SCG addition response. The target base station may be configured to provide a dedicated RACH preamble in the response. This dedicated RACH preamble is for the UE to use.

In step S3, the source base station is configured to send a message to the user equipment. The message may be any suitable message. By way of example, the message may be an RRC (radio resource control) configuration message. The message may be a handover command and/or a SCG addition message. The message which is sent from the source base station to the UE may include the dedicated RACH preamble.

In step S4, the user equipment is configured to send the RACH preamble to the target base station. This may be referred to as a message 1 (Msg1) in the RACH procedure.

In step S5, the target base station responds with an RAR (RACH response) message to the user equipment. This message may comprise one or more of timing advance information, uplink grant information and a C-RNTI (cell radio network temporary identifier).

In step S6, the UE may not receive the RAR from the target base station.

In step S7, the target base station sends to the source base station a message indicating that there has been a successful RACH access indication. This for example is based on the receipt of the message in step S4.

In step S8, the source base station will send a message to the UE indicating that the target base station has a successful reception of the RACH preamble. This may be an RRC message or via a MAC (medium access control) CE control element) or the like.

In step S9, the UE stops the power ramp up for a RACH preamble transmission. In other words, the user equipment does not resend the RACH preamble in step S4 with a higher power despite not having received the RAR response.

In step S10, the UE transmits again the RACH preamble to the target base station but using the same power level as in step S4. The UE may repeat this a given number of times until the UE receives the RAR response from the target cell.

Figure 6:
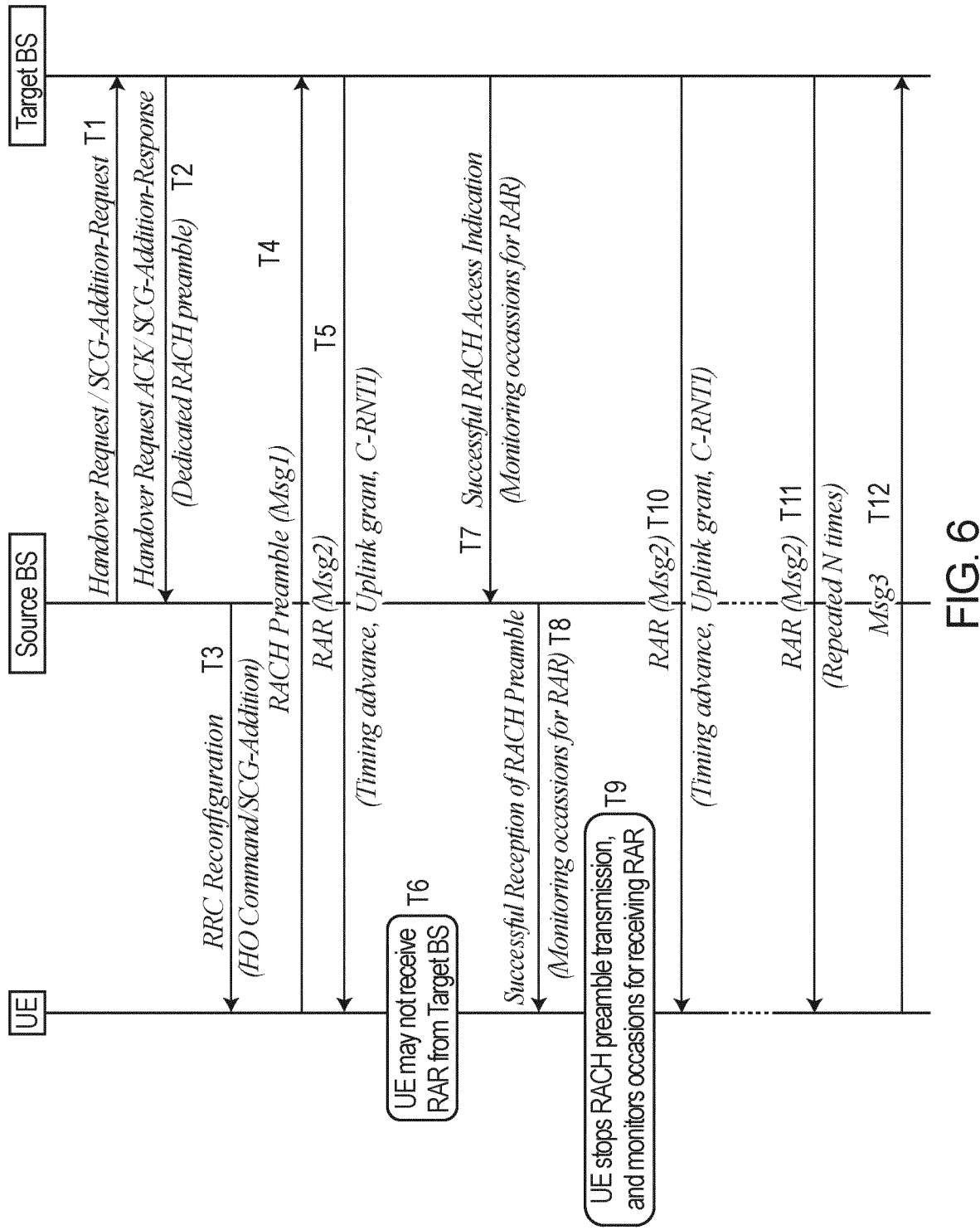
FIG. 6 shows a second signalling flow of some embodiments.

Reference is made to FIG. 6 which shows a method of some embodiments. This Figure shows the case when the UE stops the transmission of RACH preamble and monitors the indicated occasions for receiving the RAR from the target cell. If the UE receives the RAR directly from the target BS, it can simply ignore the successful reception of RACH preamble from the source BS and proceed with the sending of Msg3 to target BS.

It should be appreciated that steps T1 to T6 correspond to steps S1 to S6 respectively and will not be described in more detail.

In step T7 the target base station sends to the source base station a message indicating that there has been a successful RACH access indication. This for example is based on the receipt of the message in step T4. The target base station will also provide information indicating to the UE the time/frequency occasions it should monitor for the RAR transmissions from the target base station. The base station thus provides information as to when and/or on which radio resources it will transmit the RAR again.

In one modification, this occasion information may alternative be preconfigured in the UE or the source base station. Once the UE receives confirmation that the preamble has been received from the source cell, the UE will monitor one or more of the preconfigured occasions. The pre-configuration may be provided in any suitable way. For example, the reconfiguration may be via RRC Reconfiguration (HO Command/SCG-Addition), system information, or defined in a UE specification.

In step T8, the source base station will send a message to the UE indicating that the target base station has a successful reception of the RACH preamble. This may be an RRC message or a MAC CE or the like. This message may comprise the information about the RAR monitoring occasions to the UE.

In step T9, the UE stops the RACH preamble transmission and instead will monitor the occasions when the RAR is being transmitted.

In steps T10 the RAR is transmitted again (as in step T5) in one of the RAR occasions. In this example, the UE does not receive this transmission.

In steps T11 the RAR is transmitted again (as in step T5) in another one of the RAR occasions. In this example, the UE does receive this transmission.

When the UE receives the RAR, the UE will in step T12 send a message, for example Message 3 (Msg3)

Figure 7:
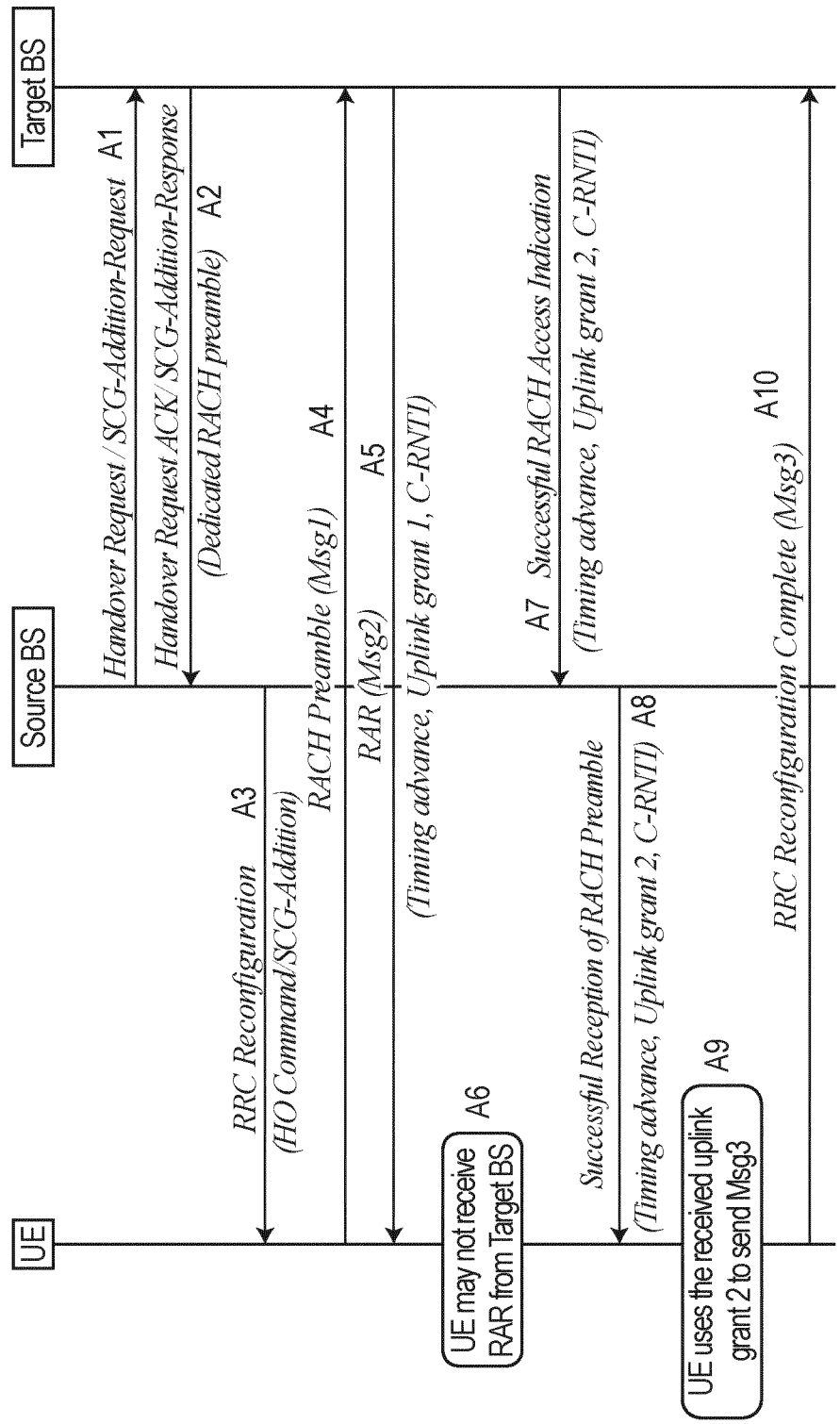
FIG. 7 shows a third signalling flow of some embodiments.

Reference is made to FIG. 7 which shows a method of some embodiments. This Figure shows the case when the UE uses the uplink grant message (grant 2) provided by target cell via the source cell to send RRC re-configuration complete message (Msg3). If the UE receives the RAR from both source and target cell, it can send Msg3 to the target cell using either uplink grant 1 or uplink grant 2. It should be appreciated that the uplink grant 2 transmitted via the source BS can be different from uplink grant 1 that is provided by the target BS to account for any delay on the X2/Xn interface.

It should be appreciated that steps A1 to A6 correspond respectively to steps S1 to S6 respectively.

In step A7, the target base station sends to the source base station a message indicating that there has been a successful RACH access indication. This for example is based on the receipt of the message in step A4. This message may comprise one or more of timing advance information, uplink grant information and a C-RNTI (cell radio network temporary identifier).

In step A8, the source base station will send a message to the UE indicating that the target base station has a successful reception of the RACH preamble. This may be an RRC message or a MAC (medium access control) CE control element) or the like. This message may comprise one or more of timing advance information, uplink grant information and a C-RNTI (cell radio network temporary identifier).

In step A9, the UE uses the RAR message (which contains an uplink grant 2 message) received from the source base station (or optionally the RAR if received in step A5) to trigger the sending of a complete message in step A10. This complete message may be a RRC configuration complete message. This message may be a Msg3.

In some embodiments, instead of sending separate messages, Msg1 and Msg3, a single message may be transmitted by the UE to the target cell. This may be after the UE has received the RACH preamble from the source cell. For example, this single message may be sent by the UE after the RRC Reconfiguration message (HO Command or SCG-Addition) or the like from the source cell. The single message may consist of the RACH preamble and a RRC Reconfiguration Complete message. In this case, the response (e.g. Msg2) sent by target cell to the UE will contain the response to single message. The UL grant provided by the response (e.g. Msg2) can be used by the UE to send immediately user data to the network via the target base station.

Figure 8:
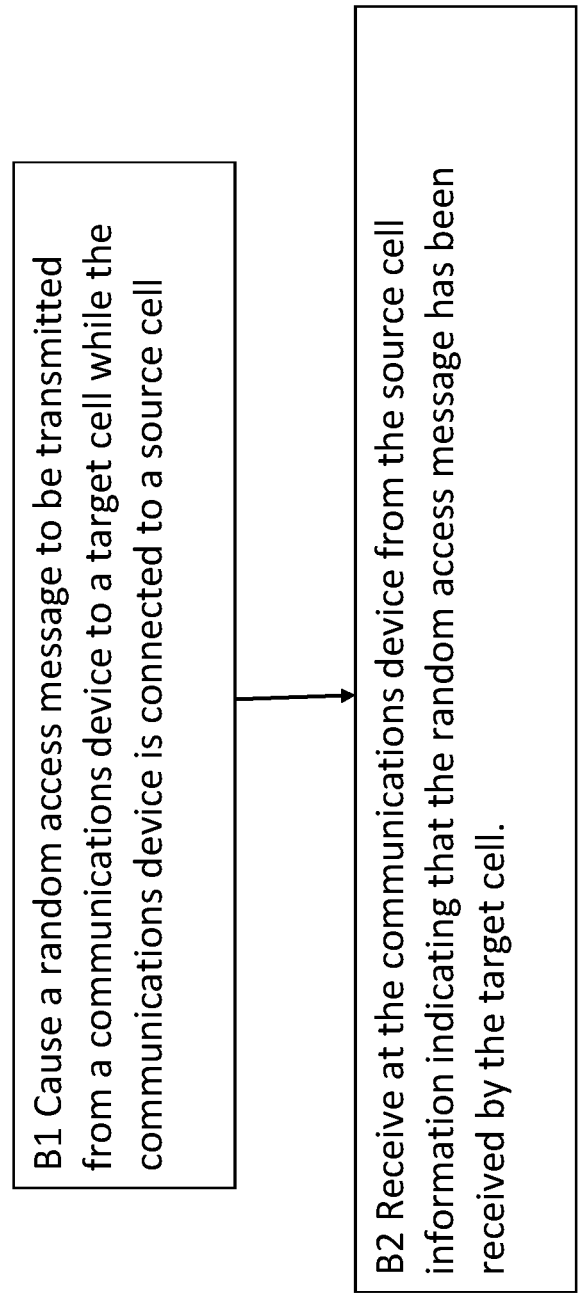
FIG. 8 shows a method in a communications device, of some embodiments.

Reference is made to FIG. 8 which shows a method of some embodiments.

In step B1, the method comprises causing a random access message to be transmitted from a communications device to a target cell while said communications device is connected to a source cell.

In step B2, the method comprises receiving at the communications device from the source cell information indicating that the random access message has been received by said target cell.

Figure 9:
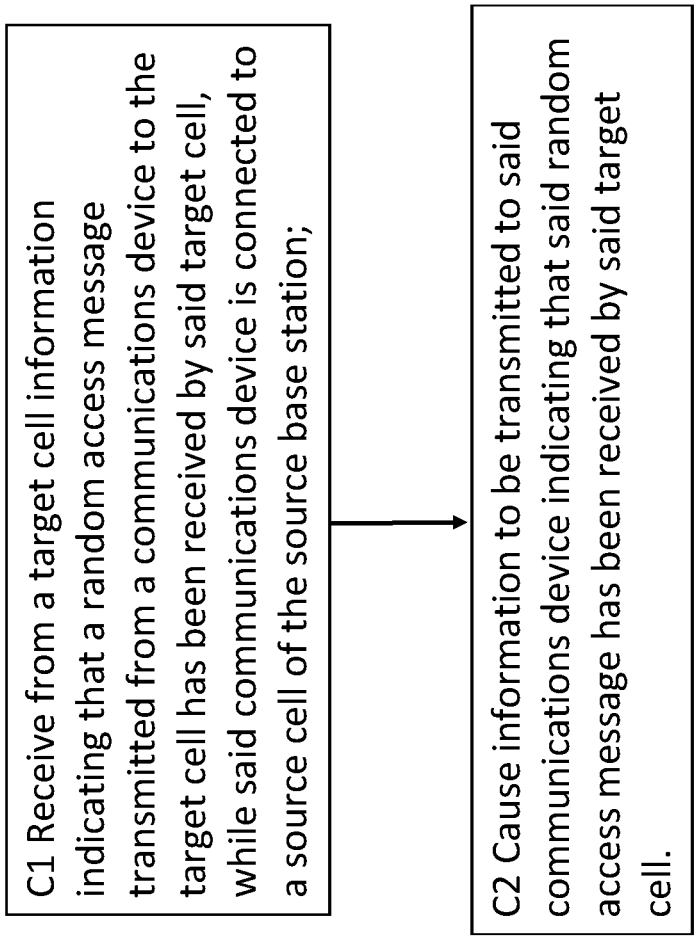
FIG. 9 shows a method in a base station of a source cell, of some embodiments.

Reference is made to FIG. 9 which shows a method performed in a base station of a source cell some embodiments.

In step C1, the method comprises receiving from a target cell information indicating that a random access message transmitted from a communications device to the target cell has been received by the target cell, while said communications device is connected to a source cell.

In step C2, the method comprises causing information to be transmitted to said communications device indicating that said random access message has been received by said target cell.

Figure 10:
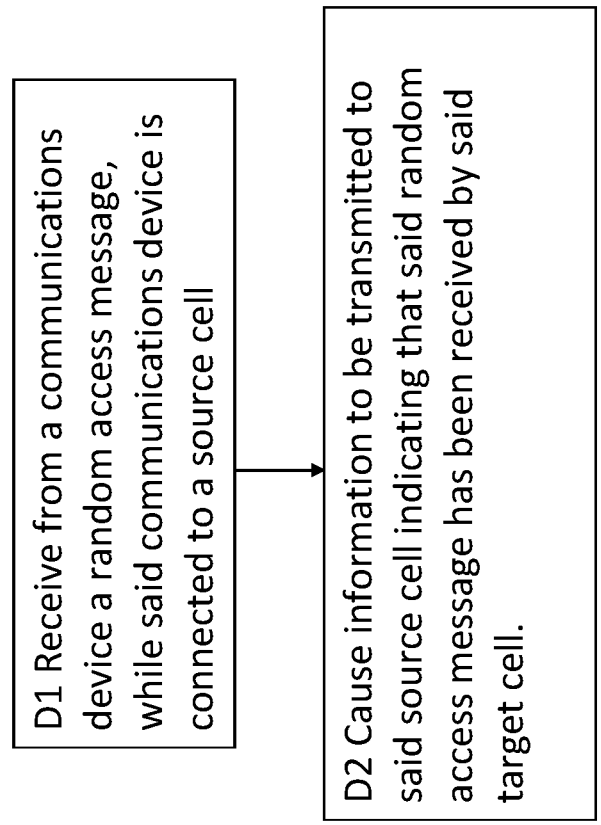
FIG. 10 shows a method in a base station of a target cell, of some embodiments.

Reference is made to FIG. 10 which shows a method performed in a base station of a target cell in some embodiments.

In step D1, the method comprises receiving from a communications device a random access message, while said communications device is connected to a source cell; and In step D2, the method comprises causing information to be transmitted to the source cell indicating that said random access message has been received by said target cell.

It is noted that while the above describes example embodiments, there are several variations and modifications which may be made to the disclosed solution without departing from the scope of the present invention. These aspects may be transposed to other radio access technology systems other than those described purely by way of example.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., in FIGS. 5 to 10 may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
(a) hardware-only circuit implementations (such as implementations in only analogue and/or digital circuitry);
(b) combinations of hardware circuits and software, such as:
  (i) a combination of analogue and/or digital hardware circuit(s) with software/firmware and
  (ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus, comprising
at least one processor; and
at least one memory storing instructions, that when executed by the at least one processor, cause the apparatus at least to:
transmit by a communication device to a target cell, a random access message while said communication device is connected to a source cell, wherein the transmitting is performed when the communications device is to be handed over from a source cell to the target cell;
receive from the source cell information indicating that the random access message has been received by said target cell, wherein said information comprises information indicating said one or more of a time occasion or frequency occasion;
cause said communications device to monitor said one or more of a time occasion or frequency occasion in which said target cell transmits a response to said communication device in response to said random access message,
wherein said random access message comprises a dedicated random access channel preamble, and wherein said random access message further comprises information indicating that said communications device is ready for communication with said target cell; and based on a response indicating that the random access message that has been received by said target cell is not received by the communications device directly from said target cell, stop of a power ramp up of transmission of transmission of said dedicated random access channel preamble so as to cause transmitting said random access message to target cell without any ramp up of power for the communication with said target cell.

2. An apparatus as claimed in claim 1, wherein said at least one memory storing instructions is executed by the at least one processor to cause the apparatus at least to:
cause the random access message to be transmitted when said communications device is adding the target cell as secondary node in a connectivity mode where said communications device is connected to a plurality of cells.

3. An apparatus as claimed in claim 1, wherein said at least one memory storing instructions is executed by the at least one processor to cause the apparatus at least to: determine a random access failure if said response is not received by said communications device from said target cell within one of a predefined time duration and a predefined number of time and/or frequency occasions.

4. An apparatus as claimed in claim 1, wherein said information comprises uplink information associated with communications between said communications device and said target cell.

5. An apparatus as claimed in claim 4, wherein said uplink information comprises one or more of uplink grant information, timing advance information, and cell radio network temporary identifier information.

6. An apparatus as claimed in claim 4, wherein said at least one memory storing instructions is executed by the at least one processor to cause the apparatus at least to:
use said uplink information to cause said communications device to send a message to said target cell.

7. An apparatus as claimed in claim 1, wherein said at least one non-transitory memory storing instructions is executed by the at least one processor to cause the apparatus at least to:
cause the communication device to add the target cell as secondary node and wherein a bearer anchored at the source cell as a master node is split to perform dual connectivity at a packet data convergence protocol level to cause the secondary node to receive protocol data units from the master node.

8. An apparatus comprising
at least one processor; and
at least one memory storing instructions, that when executed by the at least one processor, cause the apparatus at least to:
receive from a target cell information indicating that a random access message transmitted from a communications device, to the target cell has been received by said target cell, while said communications device is connected to a source cell and, wherein the receiving the random access message is based on the communications device being handed over from the source cell to the target cell,
wherein said information comprises information indicating one or more of a time occasion or frequency occasion in which said target cell transmits a response to said communication device in response to said random access message;
cause information to be transmitted to said communications device indicating that said random access message has been received by said target cell; and
indicate said one or more of a time occasion or frequency occasion,
wherein said random access message comprises a dedicated random access channel preamble, and
wherein said random access message further comprises information indicating that said communications device is ready for communication with said target cell, and
wherein based on a response indicating that the random access message that has been received by said target cell is not received by the communications device directly from said target cell, there is stopping of a power ramp up of said dedicated random access channel preamble so as to cause reception of said random access message without any ramp up of power for the communication with said target cell.

9. An apparatus as claimed in claim 8, wherein the at least one memory storing instructions is executed by the at least one processor to cause the apparatus at least to:
cause information to be transmitted to the target cell indicating if access by said communications device to said target cell is triggered early.

10. A method comprising:
causing a random access message to be transmitted from a communications device to a target cell while said communications device is connected to a source cell, wherein the transmitting is performed when the communications device is to be handed over from a source cell to the target cell;
receiving from the source cell information indicating that the random access message has been received by said target cell, wherein said information comprises information indicating said one or more of a time occasion or frequency occasion; and
causing said communications device to monitor said one or more of a time occasion or frequency occasion in which said target cell transmits a response to said communication device in response to said random access message,
wherein said random access message comprises a dedicated random access channel preamble, and
wherein said random access message further comprises information indicating that said communications device is ready for communication with said target cell; and
based on a response indicating that the random access message that has been received by said target cell is not received by the communications device directly from said target cell, stop of a power ramp up of transmission of said dedicated random access channel preamble so as to cause transmitting said random access message to target cell without any ramp up of power for the communication with said target cell.

11. The method of claim 10, comprising:
causing the random access message to be transmitted when said communications device is adding the target cell as secondary node in a connectivity mode where said communications device is connected to a plurality of cells.

12. The method of claim 10, comprising: determining a random access failure if said response is not received by said communications device from said target cell within one of a predefined time duration and a predefined number of time and/or frequency occasions.

13. The method of claim 10, wherein said information comprises uplink information associated with communications between said communications device and said target cell.

14. The method of claim 10, wherein said uplink information comprises one or more of uplink grant information, timing advance information, and cell radio network temporary identifier information.

15. The method of claim 10, comprising:
 using said uplink information to cause said communications device to send a message to said target cell.

* * * * *